(12) United States Patent
Premke

(10) Patent No.: US 9,112,642 B2
(45) Date of Patent: Aug. 18, 2015

(54) COMMUNICATION SYSTEM

(71) Applicant: SIEMENS AKTIENGESELLSCHAFT, Munich (DE)

(72) Inventor: Markus Premke, Regensburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 99 days.

(21) Appl. No.: 14/071,693

(22) Filed: Nov. 5, 2013

(65) Prior Publication Data
US 2014/0126582 A1 May 8, 2014

(30) Foreign Application Priority Data
Nov. 7, 2012 (EP) .................................... 12191530

(51) Int. Cl.
H04L 12/26 (2006.01)
H04W 4/00 (2009.01)
H04L 12/28 (2006.01)
G06F 15/16 (2006.01)
H04L 5/00 (2006.01)
H04L 12/403 (2006.01)
H04L 29/12 (2006.01)
H04L 12/40 (2006.01)

(52) U.S. Cl.
CPC ............ *H04L 5/0007* (2013.01); *H04L 12/403* (2013.01); *H04L 61/2038* (2013.01); *H04L 2012/4026* (2013.01); *H04L 2012/40254* (2013.01)

(58) Field of Classification Search
CPC ......... H04W 4/18; H04W 8/005; H04W 8/26; H04W 24/00; H04W 24/08; H04W 36/0033; H04W 48/16; H04W 72/00; H04W 84/20; Y02B 60/1235; Y02B 60/1228; G05B 2219/2231; H05B 37/0254; H04L 5/0007; H04L 9/3215; H04L 12/12; H04L 12/403; H04L 12/4616; H04L 29/12009; H04L 41/04; H04L 41/0803; H04L 41/12; H04L 61/00; H04L 61/10; H04L 61/2038; H04L 67/125; H04L 69/14; H04L 2012/4026; H04L 2012/40254
USPC ......... 370/203–211, 229–240, 252, 254–258, 370/310–350, 431, 436–437, 441, 464–465, 370/479–480; 709/201–203, 208–211, 709/223–229, 244
See application file for complete search history.

(56) References Cited

U.S. PATENT DOCUMENTS 5,887,188 A * 3/1999 Wakatani .......................... 712/31
6,141,736 A * 10/2000 Abert et al. .................... 711/156
(Continued)

FOREIGN PATENT DOCUMENTS

DE 102007043769 A1 3/2009

OTHER PUBLICATIONS

EP Search Report Application No. 12191530 dated Dec. 27, 2012.

*Primary Examiner* — Tri H Phan
(74) *Attorney, Agent, or Firm* — Harness, Dickey & Pierce, P.L.C.

(57) ABSTRACT

A method is disclosed for safe communication between a communication system by way of an OFDM method between a master and a slave, the master being able to communicate via a management channel and via a payload data channel with the slave. In an embodiment, the master assigns frequency spectra to be used for the payload data channel. The master is allocated an address of the slave and the master subsequently allocates the address to one of the frequency spectra to be used for the payload data channel. The slave stores the address transferred to it in its first microcontroller and the slave stores the address received via the payload data channel in the second microcontroller. The slave then checks whether the stored addresses match.

12 Claims, 1 Drawing Sheet

(56) References Cited

U.S. PATENT DOCUMENTS

| | | | |
|---|---|---|---|
| 6,363,444 B1 * | 3/2002 | Platko et al. | 710/110 |
| 6,854,053 B2 * | 2/2005 | Burkhardt et al. | 713/2 |
| 7,603,501 B2 * | 10/2009 | Hsieh et al. | 710/110 |
| 7,929,504 B2 * | 4/2011 | Wentink et al. | 370/338 |
| 8,082,378 B1 * | 12/2011 | Pritchard et al. | 710/110 |
| 8,230,146 B2 * | 7/2012 | Wiesgickl | 710/110 |
| 2003/0076221 A1 | 4/2003 | Akiyama et al. | |
| 2014/0025854 A1 * | 1/2014 | Breuninger | 710/110 |

* cited by examiner

COMMUNICATION SYSTEM

PRIORITY STATEMENT

The present application hereby claims priority under 35 U.S.C. §119 to European patent application number EP 12191530 filed Nov. 7, 2012, the entire contents of which are hereby incorporated herein by reference.

FIELD

At least one embodiment of the invention generally relates to a method for safely communicating within a communication system and also generally relates to a communication system.

BACKGROUND

The communication system involved is especially a communication system within industrial automation technology. The communication system is preferably used at the sensor/actuator level.

The communication system comprises at least one slave and one master, which is connected via the communication system to the slave or the slaves. The master can communicate with the slave or the slaves via the communication bus.

Data is transmitted within the communication system by way of the OFDM method. OFDM (Orthogonal Frequency-Division Multiplexing) is a method of modulation which uses a number of orthogonal carriers for digital data transmission.

If a safety-critical application is controlled by way of the master and the slave then it must be ensured that the master always communicates with the slave in an orderly manner or that errors in communication are detected. Master and slaves which meet the requirements for such safe communication will usually be referred to as safe masters and safe slaves.

SUMMARY

At least one embodiment of the present invention provides safe communication from master to slave within an OFDM communication system.

A method is disclosed in an embodiment, for safe communication within a communication system with a master, a communication bus and a slave, which comprises a first and a second microcontroller, wherein the slave is connected via the communication bus to the master, wherein the master can communicate via a management channel and via a payload data channel with the slave, wherein the communication from master to slave is undertaken by way of the OFDM method, wherein, during communication via the management channel, a different frequency spectrum is always used than for communication via the payload data channel, wherein the master assigns to the slave via the management channel frequency spectra to be used for the payload data channel, wherein the master is allocated an address of the slave and the master then allocates the address allocated to the slave one of the frequency spectra to be used for the payload data channel between the slave and the master, wherein the master transfers to the slave the address allocated to the slave via the management channel and the slave stores the address transferred to it in a first microcontroller, wherein the master transfers the address of the slave via the frequency spectrum which is allocated to the address and the slave stores the address received via the payload data channel in the second microcontroller, wherein the slave checks whether the address stored in the first microcontroller matches the address stored in the second microcontroller, and a facility in accordance with claim 6, i.e. by a communication system with a master, a communication bus and a slave, which comprises a first and a second microcontroller, wherein the slave is connected via the communication bus to the master, wherein the master can communicate with the slave via a management channel and a payload data channel, wherein the communication from the master to the slave is undertaken by way of the OFDM method, wherein, during communication via the management channel a different frequency spectrum is always used than for communication via the payload data channel, wherein the master and the slave are embodied such that:

the master can allocate frequency spectra to be used for the payload data channel to the slave via the management channel, an address of the slave can be allocated to the master, the master can allocate the address allocated to the slave to one of the frequency spectra to be used for the payload data channel between the slave and the master, the master can transfer the address allocated to the slave to the slave via the management channel, the slave can store the address transferred to it in the first microcontroller, the master can transfer the address of the slave via the frequency spectrum which is allocated to the address of the slave, the slave can store the address received via the payload data channel in the second microcontroller, the slave can check whether the address stored in the first microcontroller matches the address stored in the second microcontroller.

A communication system is disclosed in an embodiment, with a master, a communication bus and a slave, which comprises a first and a second microcontroller, wherein the slave is connected via the communication bus to the master, wherein the master can communicate via a management channel and via a payload data channel with the slave, wherein the communication from master to slave is undertaken by way of an OFDM method, wherein during communication via the management channel a different frequency spectrum is always used than for communication via the payload data channel, wherein the master and the slave are embodied such that the master can allocate to the slave via the management channel frequency spectra to be used for the payload data channel, an address of the slave can be allocated to the master, the master can allocate the address allocated to the slave to one of the frequency spectra to be used for the payload data channel between the slave and the master, the master can transfer to the slave via the management channel the address allocated to the slave, the slave can store the address transferred to it in the first microcontroller, the master can transfer the address of the slave via the frequency spectrum which is allocated to the address of the slave, the slave can store the address received via the payload data channel in the second microcontroller, the slave can check whether the address stored in the first microcontroller matches the address stored in the second microcontroller.

BRIEF DESCRIPTION OF THE DRAWINGS

The invention and embodiments of the invention are described and explained below in greater detail with reference to the exemplary embodiments shown in the figures. In the drawings.

DETAILED DESCRIPTION OF THE EXAMPLE EMBODIMENTS

Figure 1:
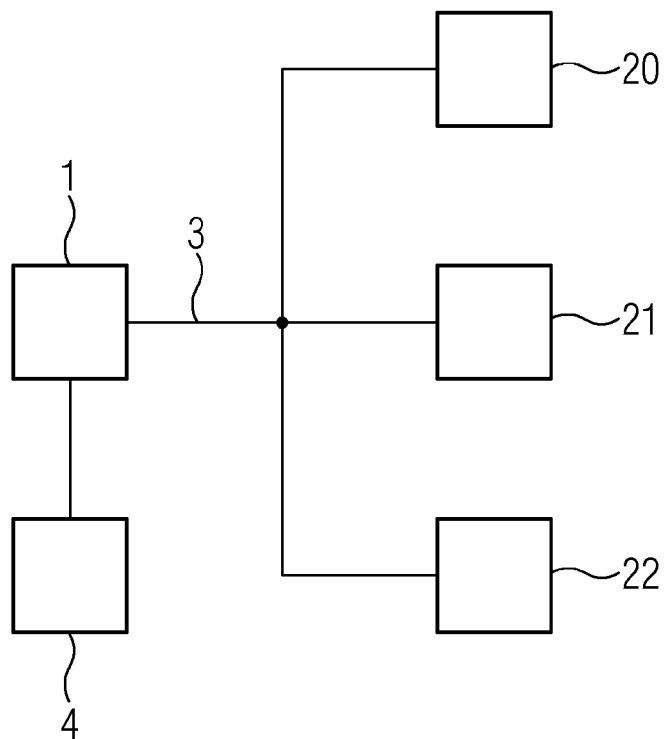
FIG. 1 shows a schematic diagram of a communication system.

The present invention will be further described in detail in conjunction with the accompanying drawings and embodiments. It should be understood that the particular embodiments described herein are only used to illustrate the present invention but not to limit the present invention.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

A method is disclosed for safe communication within a communication system with a master, a communication bus and a slave, which comprises a first and a second microcontroller, wherein the slave is connected via the communication bus to the master, wherein the master can communicate via a management channel and via a payload data channel with the slave, wherein the communication from master to slave is undertaken by way of the OFDM method, wherein, during communication via the management channel, a different frequency spectrum is always used than for communication via the payload data channel, wherein the master assigns to the slave via the management channel frequency spectra to be used for the payload data channel, wherein the master is allocated an address of the slave and the master then allocates the address allocated to the slave one of the frequency spectra to be used for the payload data channel between the slave and the master, wherein the master transfers to the slave the address allocated to the slave via the management channel and the slave stores the address transferred to it in a first microcontroller, wherein the master transfers the address of the slave via the frequency spectrum which is allocated to the address and the slave stores the address received via the payload data channel in the second microcontroller, wherein the slave checks whether the address stored in the first microcontroller matches the address stored in the second microcontroller, and a facility in accordance with claim 6, i.e. by a communication system with a master, a communication bus and a slave, which comprises a first and a second microcontroller, wherein the slave is connected via the communication bus to the master, wherein the master can communicate with the slave via a management channel and a payload data channel, wherein the communication from the master to the slave is undertaken by way of the OFDM method, wherein, during communication via the management channel a different frequency spectrum is always used than for communication via the payload data channel, wherein the master and the slave are embodied such that:

the master can allocate frequency spectra to be used for the payload data channel to the slave via the management channel, an address of the slave can be allocated to the master, the master can allocate the address allocated to the slave to one of the frequency spectra to be used for the payload data channel between the slave and the master, the master can transfer the address allocated to the slave to the slave via the management channel, the slave can store the address transferred to it in the first microcontroller, the master can transfer the address of the slave via the frequency spectrum which is allocated to the address of the slave, the slave can store the address received via the payload data channel in the second microcontroller, the slave can check whether the address stored in the first microcontroller matches the address stored in the second microcontroller.

Advantageous developments of the invention are disclosed.

The master communicates with the slave via the management channel and the payload data channel by way of the OFDM method. The frequency spectra of the management channel are preferably permanently stored in the master and/or slave here.

Preferably the slave likewise communicates with the master within the communication system using the OFDM method.

During the allocation of the frequency spectra of the payload data channel to be used in relation to the communication from master to slave via the payload data channel, an upstream evaluation of the frequency spectra of the payload data channel available is preferably carried out by the master. Preferably the slave is allocated the frequency spectra which guarantee a high transmission quality for the payload data channel by the master. The signal-to-noise ratio should lie as far as possible above a defined minimum signal-to-noise ratio. The frequency spectra of the payload data channel to be used for communication between the master and the slave via the payload data channel are allocated by the master via the management channel.

A benefit obtained by an embodiment of the invention includes the slave being able to check via a reconciliation of the address transferred via the payload data channel with the address stored in the slave, which it has obtained from the master via the management channel, whether the communication from master to slave that has taken place via the payload data channel has proceeded correctly. If the address received via the payload data channel matches the stored address, communication is in order. If the address received via the payload data channel does not match the stored address, there are errors in communication. In this way a safe communication between the master and the slave can be guaranteed.

The individual steps of the master and of the slave preferably occur automatically when the communication system is put into service.

In an advantageous embodiment of the invention the frequency spectra of the management channel and of the payload data channel lie a range between 1 MHz and 7 MHz.

In a further advantageous embodiment of the invention the master is allocated the address of the slave via an engineering tool.

The engineering tool is especially executed by way of a processing unit (e.g. laptop, PDA or PC). For visualization of the engineering tool the processing unit itself includes a graphic display element (display) or can be connected to a graphic display element. By way of the engineering tool a user can parameterize the communication system and especially allocate a specific address to the slave or the slaves of the communication system in each case. This enables a unique parameterization and/or evaluation of the slaves of the communication system to be undertaken.

To transfer an address allocated to the slave to the master the processing unit executing the engineering tool is connected to the master, so that a corresponding data transmission between the processing unit and the master can take place. The processing unit can be connected directly to the master for this purpose. It is however also conceivable for the processing unit to be connected to a controller (e.g. a programmable logic controller, abbreviated to PLC) connected upstream from the master, which is connected to the master, and for the data to be transferred to the master via the PLC. In a subsequent step the master allocates the address of the slave which it has received from the processing unit at least one frequency spectrum of the payload data channel to be used in relation to the addressed slave.

In a further advantageous embodiment of the invention, for each safe data transmission from master to slave via the payload data channel, especially via the frequency spectrum of the payload data channel allocated to the slave, the address allocated to the slave is transferred. Preferably within the payload data channel the address of the slave is merely transferred via the frequency spectra of the payload data channel allocated to the address of the slave. In this way it can always be checked by the slave whether the data transmission from the master via the payload data channel to the slave has proceeded correctly or not. If the address transferred via the frequency spectrum of the payload data channel does not match the address stored in the slave, especially in the first microcontroller, which the slave has received by the management channel, then there are errors in communication. Preferably the slave outputs an appropriate error message (e.g. to the master) when there are errors in communication. Likewise, with a detected error, a command transferred via the frequency spectrum is preferably not implemented by the slave. If the address received via the payload data channel matches the address stored in the first microcontroller, communication is in order.

In a further advantageous embodiment of the invention, communication via the payload data channel and/or via the management channel takes place redundantly via two frequency spectra of the respective channel. The allocation of the address of the slave from the master to the slave via the management channel thus occurs, preferably simultaneously, via two different frequency spectra of the management channel. The master further allocates to the address allocated to it by way of the engineering tool two frequency spectra of the frequency spectra of the payload data channel to be used between the slave and the master. The address allocated to the slave is transferred, preferably simultaneously, via the two frequency spectra of the payload data channel. The slave can consequently compare the addresses received via the two frequency spectra of the payload data channel with the addresses stored in the first microcontroller. By reconciling the addresses transferred via the payload data channel with the address stored in the first microcontroller an error can be detected by the slave. Furthermore a data transmission with errors can be detected by reconciling the addresses transferred in parallel via the management channel and/or payload data channel.

In a further advantageous embodiment of the invention communication takes place between the master and the slave or the slaves by way of an AS (actuator-sensor) interface. The communication system is thus an AS interface communication system.

FIG. 1 shows a schematic diagram of a communication system. The communication system comprises a master 1, a communication bus 3, a first slave 20, a second slave 21 and a third slave 22. The slaves 20, 21, 22 are connected to the master 1 via the communication bus 3, so that the master 1 can communicate with the slaves 20, 21, 22 via the communication bus. Communication between the master 1 and the slaves 20, 21, 22 takes place by way of the OFDM method. The communication system is a communication system within industrial automation technology. Sensors and/or actuators (sensor/actuator level within the automation pyramid) are controlled by way of the slaves 20, 21, 22.

The master 1 is connected to a processing unit 4 via a separate communication link. By way of the processing unit 4 a user can run an engineering tool for parameterization and diagnosis of the communication system. In this tool he can define the slaves 20, 21, 22 used within the communication system and allocate said slaves a unique address. By way of the unique address of the respective slaves 20, 21, 22 the user can explicitly define parameters of the respective slaves 20, 21, 22 and/or evaluate diagnostic information of the respective slave 20, 21, 22. The processing unit 4, for parameterization of the communication system, especially for transmission of the respective address of the slaves 20, 21, 22 to the master 1, merely has to be connected to the master 1. In application-related operation of the communication system the processing unit 4 does not have to be connected to the master 1.

Within industrial automation technology safety mechanisms must be implemented for safety-related communication within a communication system, by which orderly communication between a master and the individual slaves can be ensured.

Figure 2:
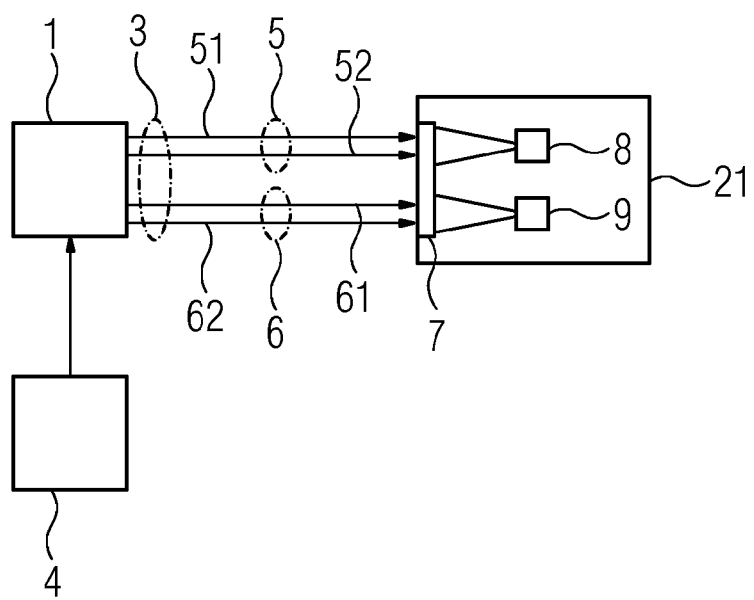
FIG. 2 shows a schematic diagram of safe communication from master to second slave of the communication system of FIG. 1.

FIG. 2 shows a schematic diagram of safe communication from master 1 to second slave 21 of the communication system of FIG. 1. The master 1 is connected to the second slave 21 via the communication bus 3. So that safe communication can be guaranteed from the master 1 to the second slave 21 it must be ensured that error-free communication is detected.

Communication between the master 1 and the second slave 21 takes place via the communication bus 3 by way of the OFDM method. The available frequency spectra of the communication method are subdivided here into two groups. The first group forms a management channel 5 comprising a number of frequency spectra. The second group forms a payload data channel 6 comprising a number of frequency spectra. In communication via the management channel 5 a different frequency spectrum is always used from that used for communication via the payload data channel 6.

The frequency spectra of the management channel 5 are permanently stored in the master 1 and also in the second slave 21. For communication with the second slave 21 via the management channel 5, the master 1 uses two different frequency spectra 51, 52 of the management channel 5. The data to be transmitted is partly transmitted redundantly via the two frequency spectra 51, 52 of the management channel 5. This enables an enhanced error determination to be made possible in relation to the data transmission via the management channel 5.

The second slave 21 includes a communication input 7, via which it is connected to the communication bus 3. Via this input it can receive the telegrams sent from the master 1 via the payload data channel 6 and/or management channel 5. The second slave 21 further includes a first and a second microcontroller 8, 9.

In order to fulfill the safety requirements within industrial automation technology relating to safety, orderly communication must be ensured. It must be established by the second slave 21 whether the telegram transmitted by the master, especially in respect of data transmission via the payload data channel, has been transmitted correctly or with errors. The following method is used to do this in relation to communication between the master 1 and the second slave 21.

A user can parameterize the communication system by way of an engineering tool executed on a processing unit 4. Specific addresses are allocated by the user to the individual slaves of the communication system here. Consequently the first, the second and the third slave are each allocated a specific address, so that a unique distinction between the individual slaves can be made via the engineering tool. For parameterization of the communication system the processing unit is connected directly or indirectly (via a PLC) with the master 1 and a parameter data set is transferred to the master 1. In this process the addresses of the slaves issued in the engineering tool are transferred to the master 1. The address of the second slave 21 is thus transferred to the master 1, so that the master 1 can store the address of the second slave 21 internally. The address of the second slave 21 stored internally in the master 1 does not have to correspond to the address of the second slave 21 visualized in the engineering tool but must merely uniquely characterize the address of the second slave 21 visualized in the engineering tool.

Via the management channel 5 the master 1 allocates to the second slave 21 the frequency spectra to be used for the payload data channel 6. For this purpose the master 1 first carries out an analysis of the frequency spectra of the payload data channel 6 available and subsequently allocates to the second slave 21 a predefined number of the frequency spectra of the payload data channel, which especially have the best signal-to-noise ratio in relation to the second slave 21.

The second slave 21 receives this information via the management channel 5 and subsequently, in relation to the payload data channel 6, monitors the frequency spectra of the payload data channel 6 assigned to it.

The address of the second slave 21 allocated to the master 1 by the processing unit is allocated two fixed frequency spectra 61, 62 by the master 1 of the frequency spectra of the payload data channel 6 to be used between the master 1 and the second slave 21. The master 1 transfers to the second slave 21 via the management channel the address allocated to the slave 21 and stored in the master 1. The second slave 21 subsequently stores the address transferred to it in the first microcontroller 8.

In the subsequent communication from the master 1 to the second slave 21 via the payload data channel 6, the master 1, preferably in each telegram from the master 1 to the second slave 21 via the payload data channel 6, transfers the address of the second slave 21 via the two frequency spectra 61, 62 which have been allocated to the address of the second slave 21.

The second slave 21 receives via the two frequency spectra 61, 62 of the payload data channel the address sent by the master 1 and stores the received address in the second microcontroller 9.

In a subsequent step the second slave 21 can check whether the address stored in the first microcontroller 8 matches the address stored in the second microcontroller 9. If the address stored in the first microcontroller 8 matches the address stored in the second microcontroller 9, communication from the master 1 to the second slave 21 is in order. If the address stored in the first microcontroller 8 does not match the address stored in the second microcontroller 9, communication from the master 1 to the second slave 21 is not in order. An error is detected. The second slave 21 outputs an appropriate warning signal. Furthermore in particular the command transferred by way of the faulty telegram is discarded. In this way a safe communication between the master 1 and the second slave 21 can be guaranteed. Thus a safe master 1 and a safe slave 21 can be provided within the communication system.

The master 1 is embodied such that it is suitable for safe communication, i.e. it is inherently safe or has a safe local evaluation unit.

The redundant transmission of the telegrams via the two frequency bands 51, 52 of the management channel 5 or the two frequency bands 61, 62 of the payload data channel 6 also means that a check is made as to whether the transmitted telegram has been received correctly by the second slave 21.

In safe communication from master 1 to second slave 21 the address of the second slave 21 is transmitted via the two frequency spectra 61, 62 of the payload data channel especially for each transfer of a telegram from the master 1 to the second slave 21 via the payload data channel 6.

The communication between the master 1 and the first and third slave takes place in a similar way to the communication between the master 1 and the second slave 21, with the difference that the first and third slave are each assigned a different address and the frequency bands to be used for the payload data channel 6 as well as the frequency bands allocated to the address of the respective slave can be different. The first and third slave of the communication system from FIG. 1 is also structured similarly to the second slave 21.

Preferably when a slave of the communication system is replaced and/or started up, the address of the respective slave stored in the master 1 will be transmitted again to the slave via the management channel and payload data channel.

The selected different transmission paths from master 1 to slave (input/output slave) satisfy the diversity demanded, since although they are transmitted on the same physical medium (e.g. cable of the communication bus 3) they are transmitted via fully independent transmission channels (management channel 5 and payload data channel 6) redundantly and offset in time. The first address allocation takes place via the management channel 5 of the communication bus 3. The second address allocation is executed via the inherently redundant payload data channel 6. The allocation undertaken in this way saves having to set the address on the respective slave of the communication system The transferred addresses are stored at the respective slaves in independent hardware units (first and second microcontroller 8, 9) so that a subsequent test can check whether the stored addresses match. This enables safe communication from master 1 to slave to be guaranteed.

Addressing of the slave via an addressing device or a dip switch can be dispensed with. This simplifies matters for the customer and saves money, since no dip switches or no separate safe addressing device is necessary.

What is claimed is:

1. A method for safe communication within a communication system with a master, a communication bus and a slave, the slave including a first and a second microcontroller, wherein the slave is connected via the communication bus to the master, wherein communication between the master and the slave is configured to occur via a management channel and via a payload data channel, wherein the communication from master to slave is undertaken by way of an OFDM method, and wherein, during communication via the management channel, a different frequency spectrum is used than is used for communication via the payload data channel, the method comprising:

assigning, via the master to the slave via the management channel frequency, spectra to be used for the payload data channel;

allocating the master an address of the slave;

subsequently allocating, via the master to the slave, the allocated address one of the frequency spectra to be used for the payload data channel between the slave and the master;

transferring, via the master to the slave, the address allocated to the slave via the management channel, the address transferred to the slave being subsequently stored in a first microcontroller;

transferring, via the master, the address of the slave via the frequency spectrum allocated to the address of the slave, the address subsequently being received via the payload data channel and stored in the second microcontroller, and the slave subsequently checking whether the address stored in the first microcontroller matches the address stored in the second microcontroller.

2. The method of claim 1, wherein the frequency spectra of the management channel and the payload data channel lie in the range between 1 MHz and 7 MHz.

3. The method of claim 2, wherein the master is allocated the address of the slave via an engineering tool.

4. The method of claim 2, wherein, for each safe data transmission from the master to the slave via the payload data channel, the address allocated to the slave is transferred.

5. The method of claim 2, wherein the communication via at least one of the payload data channel and the management channel takes place redundantly via two frequency spectra of the respective channel.

6. The method of claim 1, wherein the master is allocated the address of the slave via an engineering tool.

7. The method of claim 6, wherein, for each safe data transmission from the master to the slave via the payload data channel, the address allocated to the slave is transferred.

8. The method of claim 6, wherein the communication via at least one of the payload data channel and the management channel takes place redundantly via two frequency spectra of the respective channel.

9. The method of claim 1, wherein, for each safe data transmission from the master to the slave via the payload data channel, the address allocated to the slave is transferred.

10. The method of claim 9, wherein the communication via at least one of the payload data channel and the management channel takes place redundantly via two frequency spectra of the respective channel.

11. The method of claim 1, wherein the communication via at least one of the payload data channel and the management channel takes place redundantly via two frequency spectra of the respective channel.

12. A communication system comprising:
a master;
a communication bus; and
a slave, including a first and a second microcontroller, the slave being connected via the communication bus to the master, wherein communication between the master and the slave is configured to occur via a management channel and via a payload data channel, wherein the communication from master to slave is to be undertaken by way of an OFDM method, wherein during communication via the management channel, a different frequency spectrum is used than for communication via the payload data channel, and wherein the master and the slave are configured such that the master is configured to allocate frequency spectra, to be used for the payload data channel, to the slave via the management channel, an address of the slave is allocatable to the master;

the master is configured to allocate the address allocated to the slave to one of the frequency spectra to be used for the payload data channel between the slave and the master, the master is configured to transfer the address allocated to the slave from the master to the slave via the management channel, the slave is configured to store the transferred address in the first microcontroller, the master is configured to transfer, via the frequency spectrum which is allocated to the address of the slave, the address of the slave, the slave is configured to store the address received via the payload data channel, in the second microcontroller, and the slave is configured to check whether the address stored in the first microcontroller matches the address stored in the second microcontroller.

\* \* \* \* \*